United States Patent [19]
Harris

[11] Patent Number: 5,491,578
[45] Date of Patent: Feb. 13, 1996

[54] OPTICS FOR PASSIVE SCAN ANGLE DOUBLING

[75] Inventor: Ellis D. Harris, Claremont, Calif.

[73] Assignee: Xerox Corporation, Stamford, Conn.

[21] Appl. No.: 358,287

[22] Filed: Dec. 19, 1994

[51] Int. Cl.⁶ ................................................ G02B 26/08
[52] U.S. Cl. ........................... 359/208; 359/212; 359/217
[58] Field of Search ..................................... 359/196, 197, 359/201, 205–208, 212, 216–219, 223, 226; 250/230, 236; 358/474

[56] References Cited

U.S. PATENT DOCUMENTS

3,973,826 8/1976 Lobb ......................................... 359/203

Primary Examiner—Paul M. Dzierzynski
Assistant Examiner—Darren E. Schuberg
Attorney, Agent, or Firm—Nola Mae McBain

[57] ABSTRACT

A scan angle doubling system using a rotating mirror polygon, a cylinder mirror, and a lens to increase the scanning angle available from a rotating mirror polygon of a given size. The properties of the passive components are such that the output light beam from the rotating mirror polygon is collimated and normal to the rotating mirror polygon. The polygon, cylinder mirror, and lens are arranged such that the rotating polygon and the cylinder mirror are opposed to each other and separated by a distance greater than the sum of the radius of curvature of the cylinder mirror plus the focal length of the lens, and the lens is interposed between the rotating polygon and the cylinder mirror so that the center of the radius of curvature of the cylinder mirror and the focal point of the lens means are coincident.

14 Claims, 8 Drawing Sheets

OPTICS FOR PASSIVE SCAN ANGLE DOUBLING

BACKGROUND

Figure 1:
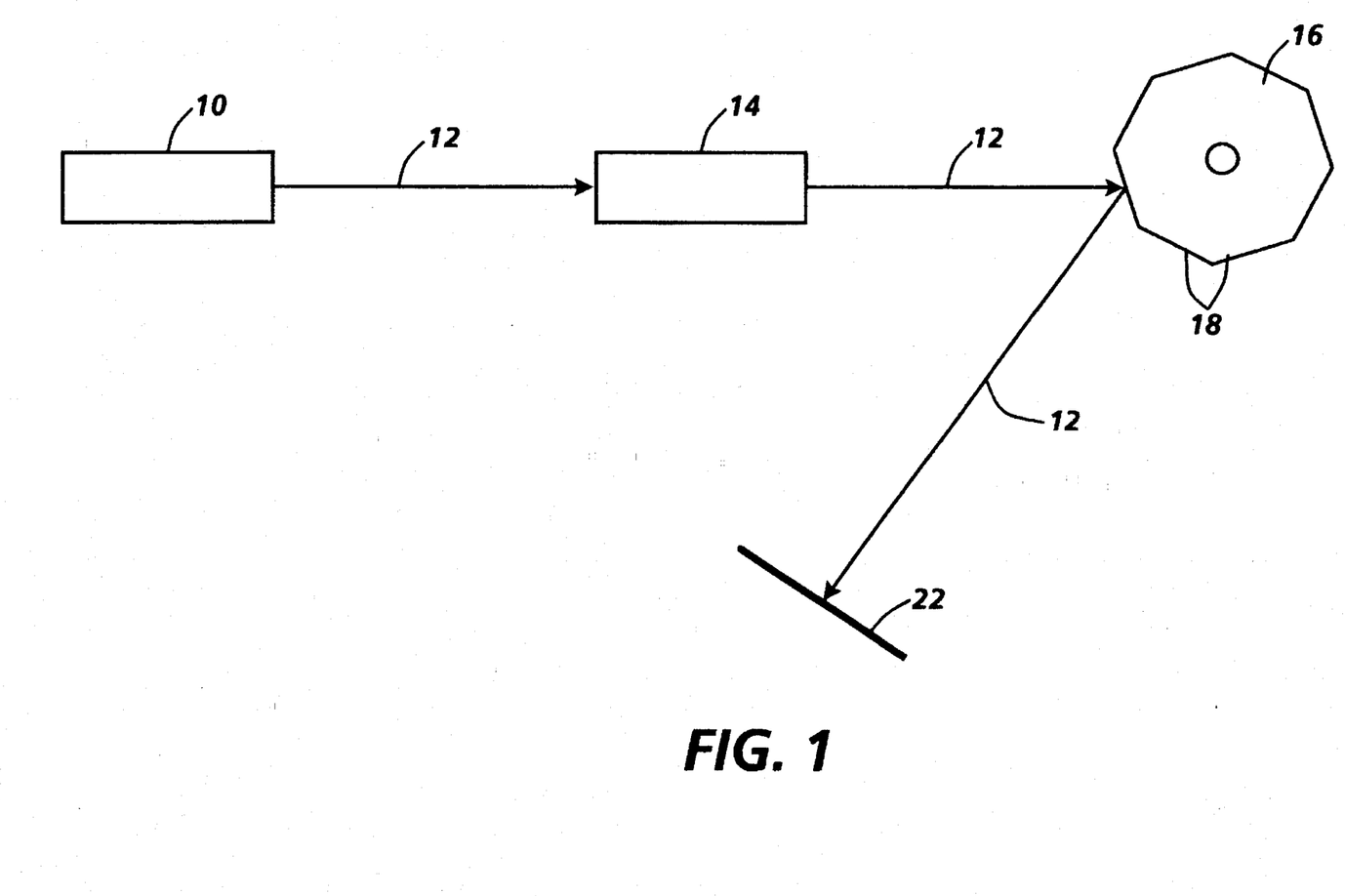
FIG. 1 shows a typical laser printing device utilizing a rotating mirror for scanning.

This invention relates to scanning devices employing a rotatable mirror device such as those used in laser printing devices and specifically to facet tracking devices. FIG. 1 shows a typical laser printing device utilizing a rotating mirror for scanning. A laser 10 emits a beam 12 towards pre-polygon optics 14. After passing through the pre-polygon optics 14, the beam 12 falls on a scanner 16. The scanner 16 is a rotating polygon with flat reflecting facets 18. As the scanner 16 rotates, the beam 12 is scanned along a scan line on a photoreceptor 22. The direction along the scan line 20 is the tangential plane and the direction perpendicular to the scan line on the photoreceptor 22 is the sagittal plane.

Scanner performance is determined by the physical limitations on the speed at which the mirror is rotated, by the angular deflection of the laser beam achieved by reflection from a facet from the rotating polygon, the size of the facets, and the width of the beam being scanned where it is incident on the rotating mirror.

One method for increasing scanning speeds is the use of angle doubling with small sized polygon assemblies. For an "F-THETA" scan lens, commonly employed in laser scanners, the scanned distance on the photoreceptor is the product of the scan angel (THETA) and the effective focal length (F). Whenever the scan angle can be increased, the effective focal length can be decreased. A decrease in effective focal brings two primary advantages. Firstly, the smaller focal length translates directly into a smaller physical casting, or base upon which the optical components are mounted. Glass lens elements, mirrors and all other components can be smaller. The end result is a smaller, lighter, less costly product. Secondarily, the shorter focal length requires a smaller beam at the rotating polygon, further reducing the sizes of optical and mechanical components.

A further advantage results from scan angle doubling in that any given scan distance along the photoreceptor can be achieved with only half the polygon angular rotation. By this means, the polygon speed of rotation is significantly reduced, allowing lighter, smaller and less costly motor bearings as well as better bearing lifetime and overall performance.

Scan angle doubling devices are known and have been described as in U.S. Pat. No. 3,973,826 by Lobb which describes a device for passive facet tracking and angle doubling.

Lobb describes two scan angle doubling configurations. The first comprises a rotating mirror which reflects light into a static optical system. The static optical system reflects the received light back onto the rotating mirror. The static optical system is comprised of single system consisting of a roof prism and a field lens or a plurality of static optical systems arranged in an arc in the scanning area, each system comprising a roof prism and a field lens.

In the Lobb patent, the beam is not collimated at the scanner facet in the scanning plane, thus any variation in radius between the facets will translate into scanning errors on the scanning plane. In a laser printing application, these scanning errors show up as pixel placement errors visible on a printed page. When the scanned beam is collimated, in the scanned plane at the scanner facet, polygon manufacturing tolerances can be relaxed with resultant cost savings.

In the Lobb patent, the beam is not focused on the scanner facet in the sagittal plane. As a consequence, pyramidal errors in the scanner facet and bearing wobble will result in variable spacing between scan lines. In a laser printing application, these errors show up on the printed page as differences in spacing between the printed lines. Even very small differences are apparent, producing unacceptable output quality. When the beam is focused on the scanner facet in the sagittal plane, pyramidal errors may be optically removed by focussing the beam from the facet onto the scan line. Again, this allows polygon manufacturing tolerances to be relaxed with resultant cost savings and no loss in print quality.

The present invention uses anamorphic optics to collimate the beam in the tangential plane at the scanning facet and to focus the beam in the sagittal plane at the scanning facet so that errors produced by radial and pyramidal variations of the scanning facets may be substantially reduced or easily corrected to provide for improved scanning.

Further advantages of the invention will become apparent as the following description proceeds.

Summary of the Invention

Briefly stated, and in accordance with the present invention, there is provided a scan angle doubling system using passive optical components to increase the scanning angle available from a rotating mirror polygon of a given size. Following a first angular deflection from a mirror facet of a rotating polygon, a laser beam is returned by reflection to the facet in such a manner that, upon reflection a second deflection adds in the tangential plane, thus effectively achieving twice the scan angle for any given polygon rotation. In the sagittal plane, however, the beam is returned to the facet in such a manner that any beam deflection from the first reflection is cancelled by the second reflection. In the tangential plane, beam collimation is maintained at the facet, allowing relaxation of certain manufacturing tolerances. In the sagittal plane, the beam is focussed upon the facet allowing the relaxation of additional polygon manufacturing tolerances.

While the present invention will be described in connection with a preferred embodiment and method of use, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Figure 2:
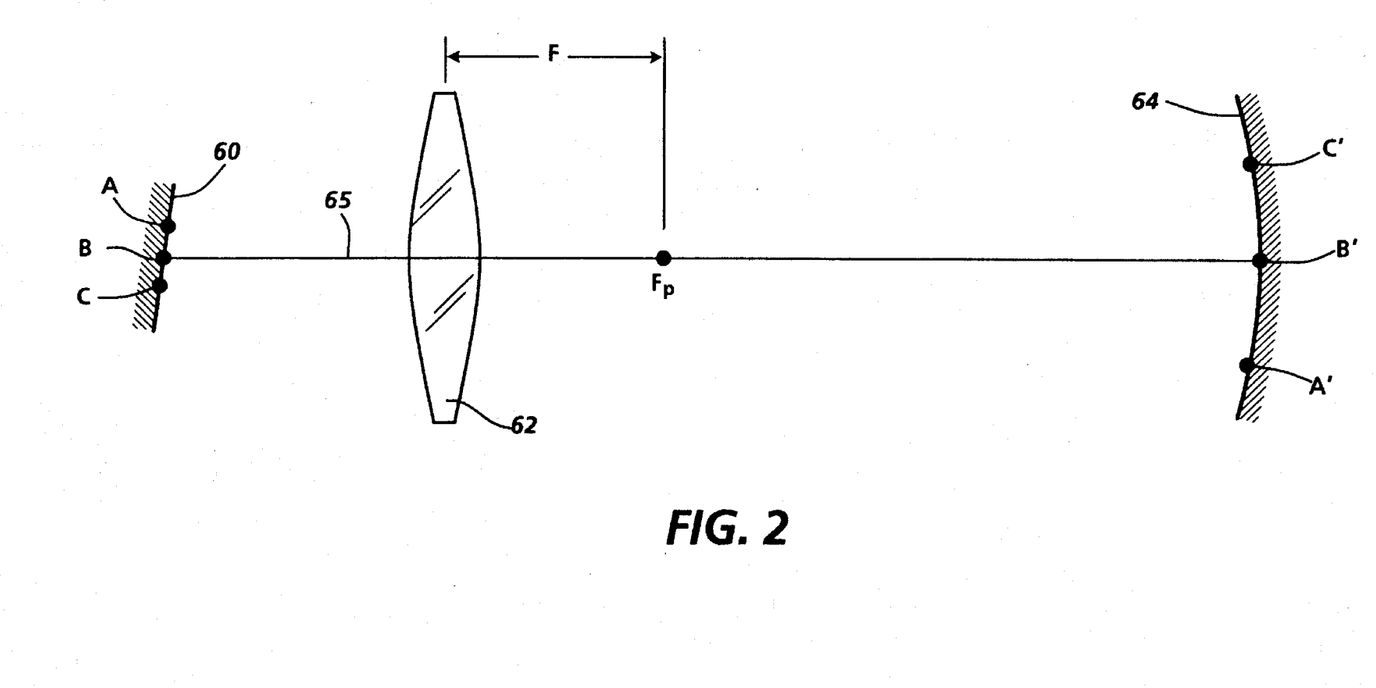
FIG. 2 shows a tangential view of a passive scan angle doubling device according to the present invention.

FIG. 2 shows a tangential view of a passive scan angle doubling device according to the present invention. A flat facet 60 of a rotating polygon assembly is shown with three points A,B,C marked on it. A cylinder mirror 64 is shown with conjugate points A', B', C' marked on it. A lens 62 with a focal length F is disposed between the flat facet 60 and the cylinder mirror 64. The center of radius of curvature of the cylinder mirror 64 is coincident with back focal point Fp of the lens 62.

A light beam 65 is shown reflected from the flat facet 60 such that it leaves the flat facet 60 at point B and becomes focussed at the conjugate point B' on the cylinder mirror 64. The cylinder mirror 64 is normal to the optic axis line B—B' and therefore returns the light beam 65 to point B on the flat facet 60. The same analysis applies to beams reflected from points A and C on flat facet 60. These properties of the arrangement of the flat facet 60, the lens 62 and the cylinder mirror 64 will be used to provide scan angle doubling.

Figure 3:
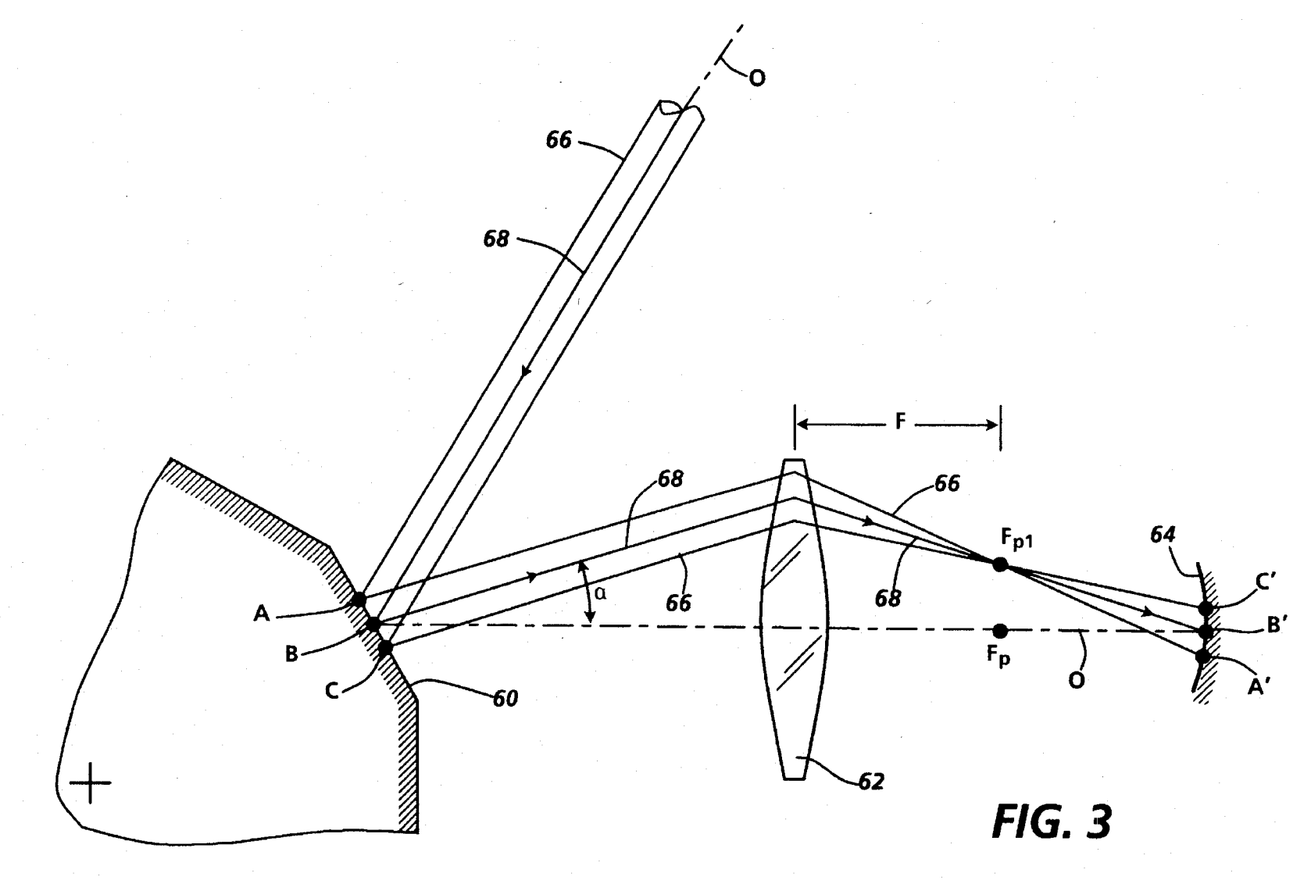
FIG. 3 shows the same assembly shown in FIG. 2 after partial propagation of a light beam.

FIG. 3 shows the same assembly shown in FIG. 2. A light beam 66 is reflected by the flat facet 60 with the angle of reflection determined by the angle of rotation of the flat facet 60. Angles of reflection will be measured from a line O, the optic axis between the flat facet 60 and the cylinder mirror 64. The light beam 66 is collimated in this plane. Upon reflection, the light beam 66 is reflected by an angle $\alpha$ (a relative difference) becoming reflected beam 66. The reflected angle $\alpha$ results from a polygon rotation angle of $\alpha/2$.

The reflected beam 66, including chief ray 68, passes through the lens 62 and is brought to a focus at a focus point $fp_1$ following which it expands and is incident upon the cylinder mirror 64. Because the light beam 66 is reflected from points on the flat facet 60 to the conjugate points on the cylinder mirror 64, the parts of the light beam 66 which are reflected from point A are reflected to point A' on the cylinder mirror 64, the parts of the light beam 66 reflected from point B are reflected to point B'(this is the chief ray 68), and the parts of light beam 66 reflected from point C are reflected to point C'.

Figure 4:
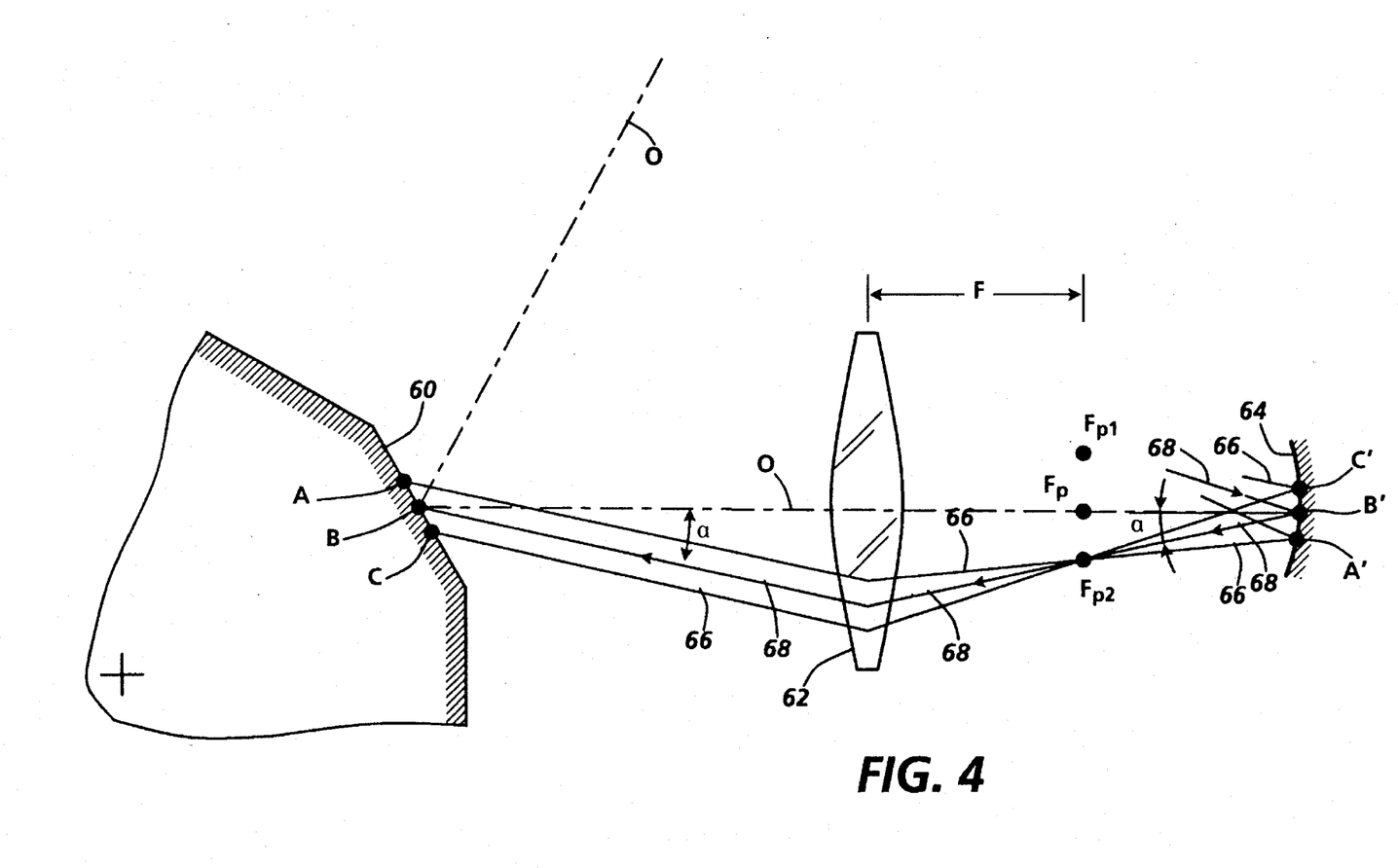
FIG. 4 shows the same assembly shown in FIG. 3 after further propagation of the light beam.

FIG. 4 shows the same assembly shown in FIGS. 2 and 3 after the light beam 66 is reflected from the cylinder mirror 64 and returns to the facet 60 through a path including focal point $f_{p2}$ and lens 62. At the facet 60 the light beam 66 is reflected in a direction which adds to the total deflected angle $\beta$ which is equal to $2\alpha$. If the light beam 66 were to simply retrace its path, returning by way of focal point $f_{p1}$, two angular deflections from the flat facet 60 would subtract and cancel each other out. The laser beam would simply return to its source through a path including prepolygon optics 14. The fact that light beam 66 is reflected by the same angle but in the opposite direction dictates that the two angular deviations caused by the two reflections from the facet will add.

Therefore, the beams of the light beam 66 are reflected from the conjugate points A', B' and C' and returned to a focus at focus point $fp_2$. Notice that focus point $fp_1$ and focus point $fp_2$ are displaced from each other symmetrically about the optic axis B—B'. The displacement is determined by the reflected angle $\alpha$ of the light beam 66 when it is reflected from the flat facet 60. The light beam 66 then passes through the lens 62 and results in a collimated ray bundle striking the flat facet 60 at an angle $\beta$, equal to twice the single reflection angle $\alpha$. The resultant angle of reflection $\beta$ is four times the angle of polygon rotation which is $\alpha/2$.

Figure 5:
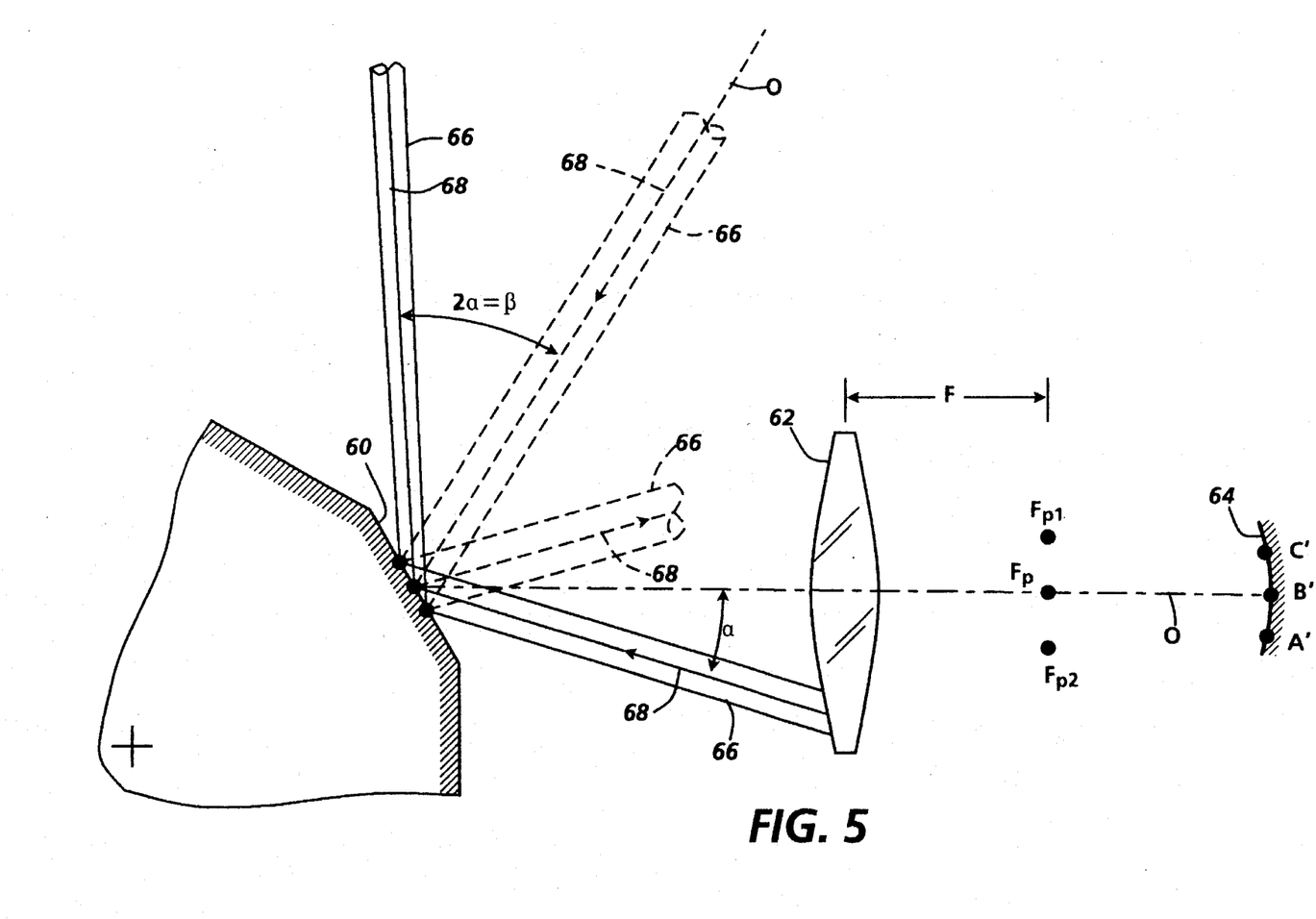
FIG. 5 shows the same assembly shown in FIG. 4 after further propagation of the light beam.

FIG. 5 shows the same assembly shown in FIGS. 2, 3, and 4 after the collimated ray bundle forming the light beam 66 is reflected a second time from the flat facet 60. The reflected light beam 66 is reflected at an angle $\alpha$ which is twice angle $\alpha$, the angle of the first reflection from the flat facet 60 (earlier reflection shown in dotted lines). The light beam 66 now exits the assembly. The light beam 66, which was focussed at focal point fp2, is collimated by lens 62 in the tangential plane. Tangential plane collimation at the polygon is thus preserved by the passive scan angle doubling optics.

This method of scan angle doubling is not limited to two reflections from the flat facet 60. The light beam 66 can make several round trips between the flat facet 60 and the cylinder mirror 64. Each time the light beam 66 returns to the flat facet 60 to be reflected, it will be reflected by an additional amount equal to twice angle $\alpha$ or angle $\beta$. This would result in scan angle multiplication of the original beam angle.

Figure 6:
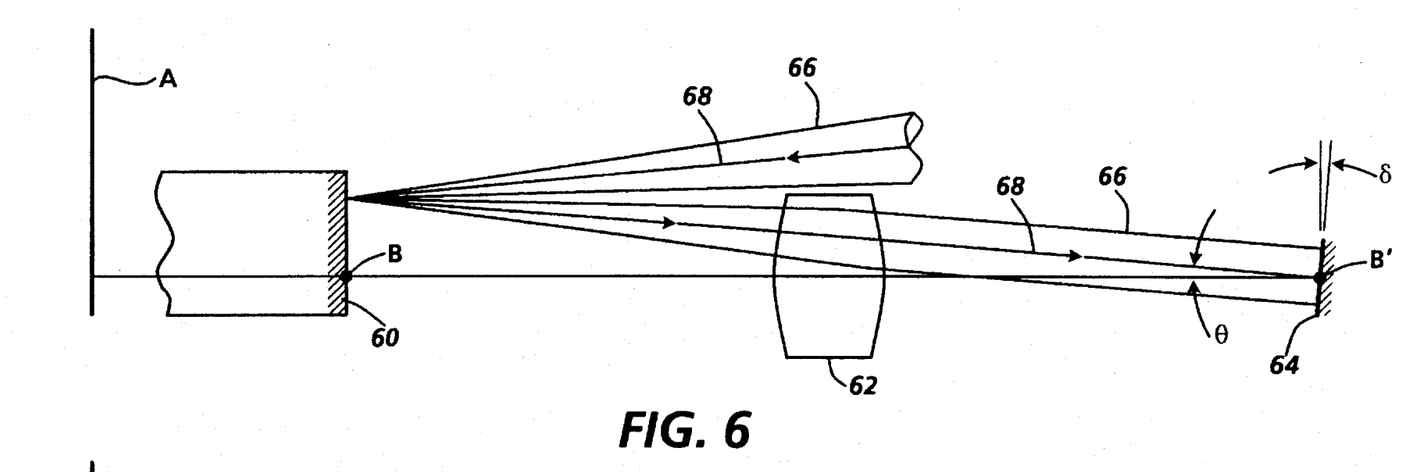
FIG. 6 shows a sagittal view of a passive scan angle doubling device after partial propagation of a light beam.
Figure 7:
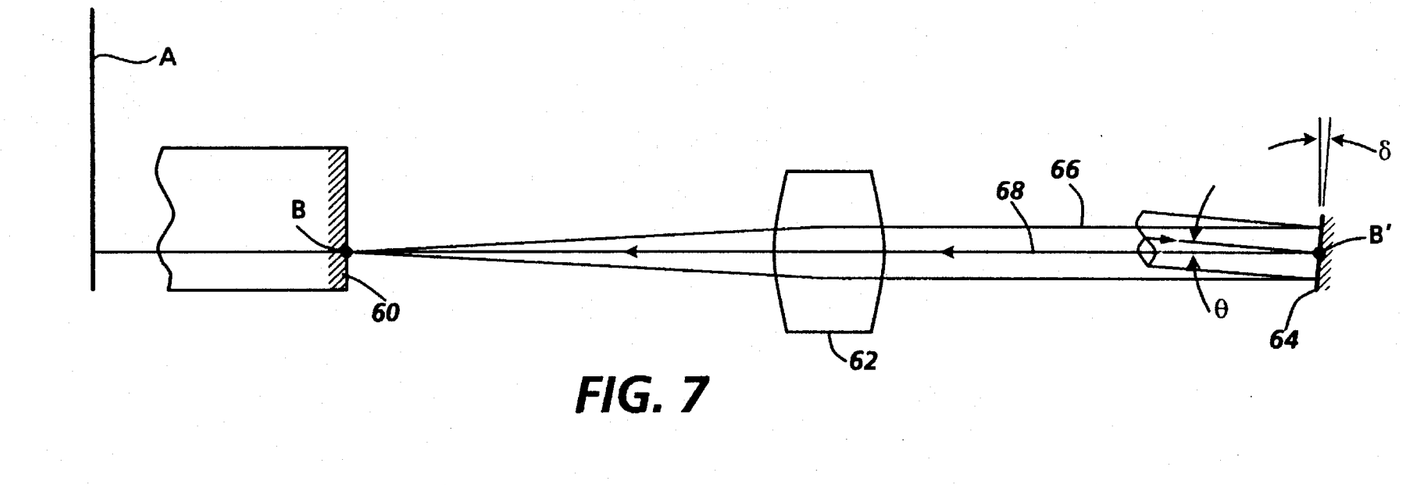
FIG. 7 shows a sagittal view of a passive scan angle doubling device shown in FIG. 6 after further propagation of the light beam.
Figure 8:
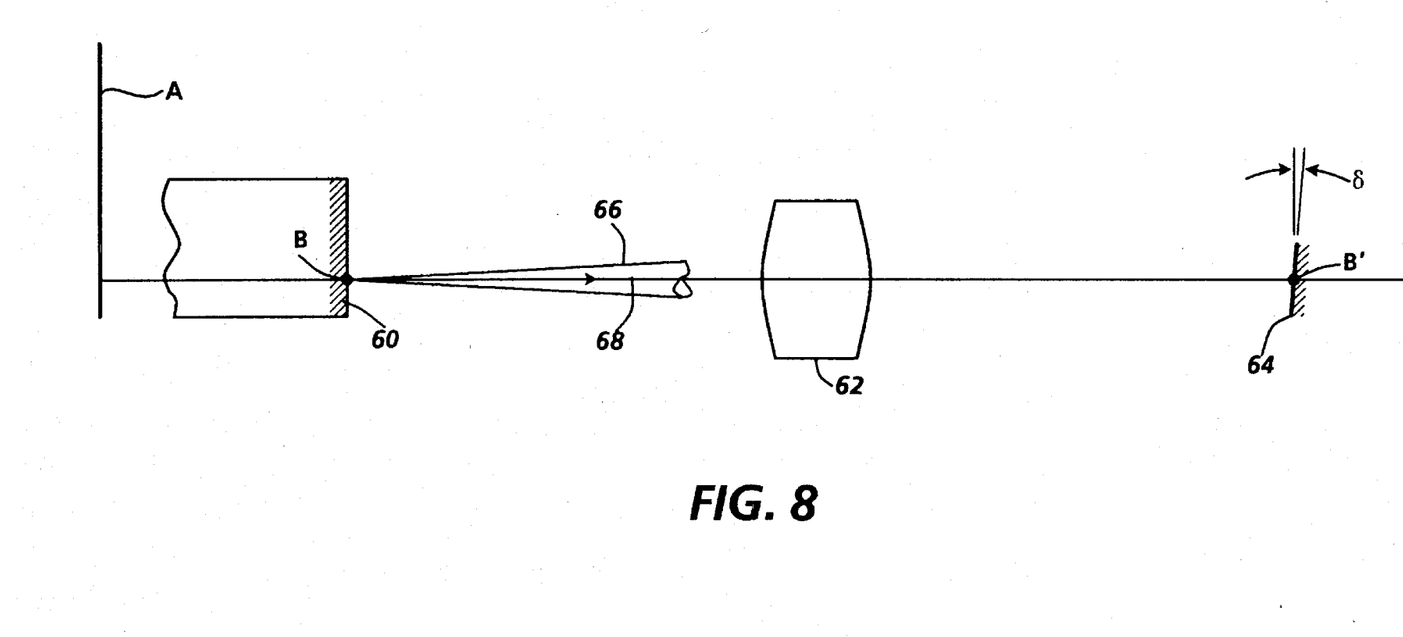
FIG. 8 shows a sagittal view of a passive scan angle doubling device shown in FIG. 7 after further propagation of the light beam.

FIGS. 6, 7, 8 show the same assembly shown in FIGS. 3 through 5 in a sagittal view rather than a tangential view and showing how the assembly can be used to preclude scan line bow. The flat facet 60 has a rotating polygon assembly axis A.

Scan line bow is caused when the light beam 66 is not perpendicular to the rotating polygon assembly axis A. FIGS. 11–13 show how an alteration to the cylinder mirror 64 can insure that the light beam 66 is perpendicular to the mpa axis A and therefore eliminate scan line bow.

As shown in FIG. 6, the light beam 66 from the light source is focussed upon the flat facet 60. The light beam 66 is then reflected by the flat facet 60 as a diverging beam. After light beam 66 passes through the lens 62, which is an anamorphic lens of lower optical power in the sagittal plane, the light beam 66 travels towards the cylinder mirror 64 as a collimated beam in the sagittal plane.

As shown in FIG. 7, the light beam 66 is then reflected by the cylinder mirror 64 while maintaining its collimation. The light beam 66 then passes again through the lens 62 where it refocussed on the flat facet 60. It is this return trip that contributes to or eliminates scan line bow. If the light beam 66 is perpendicular to the mpa axis A on this return trip then scan line bow will be precluded.

To correct for scan line bow, an angle $\Phi$ between the chief beam 68 of the light beam 66 and an optic axis B—B' between the cylinder mirror 64 and the rotating polygon assembly axis A and which is perpendicular to the mpa axis A must be measured. To insure that the chief beam 68 is parallel to the optic axis B—B' and perpendicular to the MPA axis A, the cylinder mirror 64 must be tilted by an angle $\delta$ which is equal to ½ of the angle $\Phi$. When this is done, the light beam 66 will approach the flat facet 60 along the optic axis O and perpendicular to the MPA axis A as shown in FIG. 7.

The light beam 66 is reflected from the flat facet 60 for a second time as shown in FIG. 8. Any pyramidal error introduced into the light beam 66 in the first reflection from the flat facet 60, shown in FIG. 6, will be exactly cancelled when the light beam 66 is reflected from the flat facet 60 the second time, as shown in FIG. 8. This is because, unlike the reflections in the tangential plane which add to each other, reflections in the sagittal plane cancel each other out.

The condition of focus on the flat facet 60 in the sagittal plane is required for optical wobble correction and is maintained throughout the two reflections.

Figure 9:
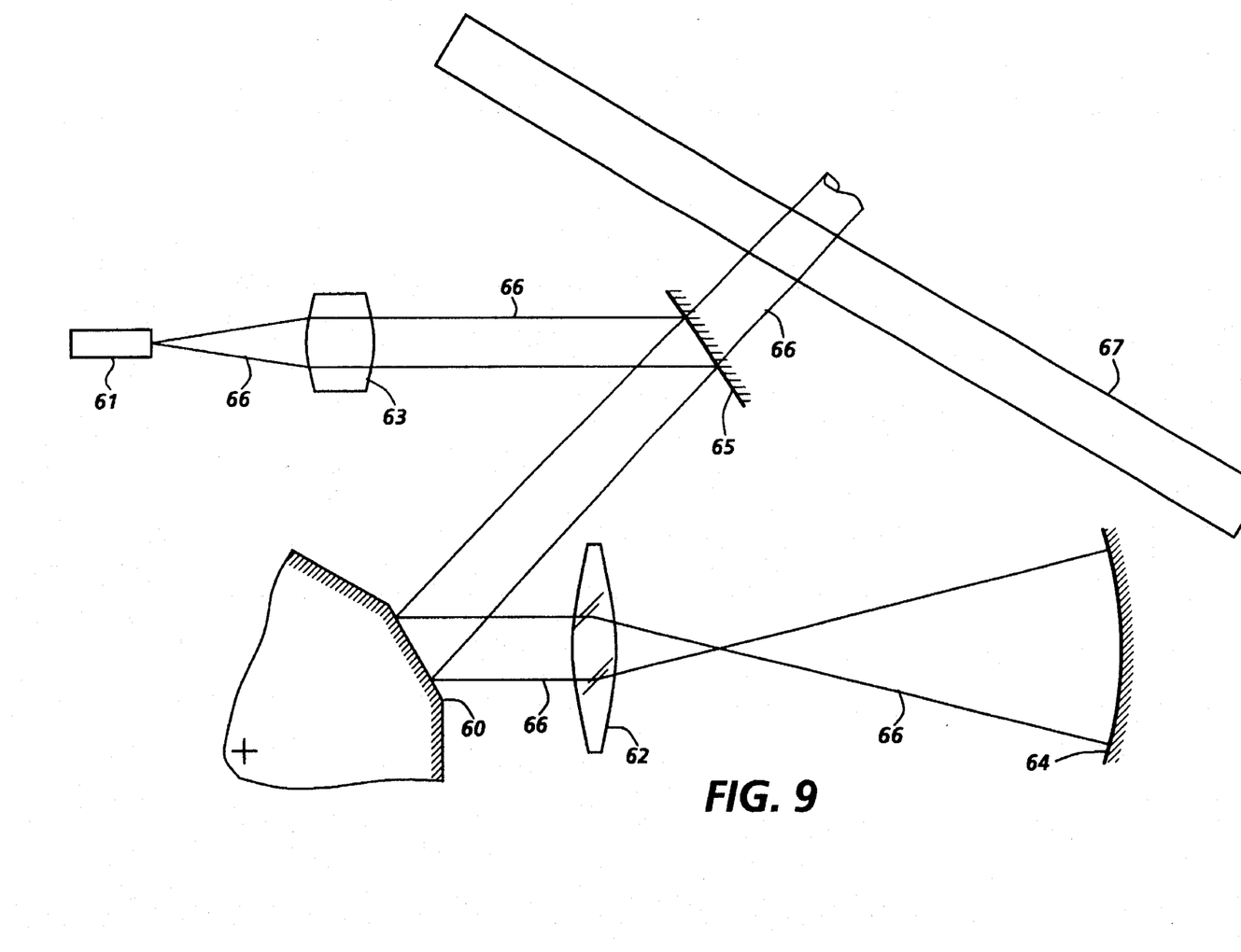
FIG. 9 shows a sagittal view of a passive scan angle doubling device shown in FIG. 2 used in a laser scanning system.

FIG. 9 shows the passive scan angle doubling system used in a scanning system including a light source 61, pre-polygon optics 63, a mirror 65 to direct the beam 66 towards the flat facet 60 and post scanning optics 67.

In FIGS. 7—13, the lens 62 is shown as a single element lens for illustrative purposes only to describe the concepts. In actual practice, the lens 62 may be a combination lens using one or more cylinder elements.

It should be noted that all optical elements are placed to avoid mechanical interferences. Whenever a drawing in one view shows an apparent interference, looking at the structure with another view shows that the elements and beams are actually displaced from each other.

I claim:

1. A scan angle doubling system comprising:
   A) scanning means with at least one reflective facet and a normal which is perpendicular to the reflective facet,
   B) a cylinder mirror with a tangential plane radius of curvature and a center of the radius of curvature,
   C) a focussing lens means with a focal length and a focal point,
   D) said scanning means, cylinder mirror, and focussing lens means being so arranged such that said scanning means and said cylinder mirror are opposed to each other and separated by a distance greater than the sum of the radius of curvature plus the focal length, and said focussing lens means being interposed between said scanning means and said cylinder mirror such that the center of the radius of curvature of said cylinder mirror and the focal point of said focussing lens means are coincident, and
   E) said scanning means, cylinder mirror, and focussing lens means being so constructed and arranged relative to each other to reflect a beam along a first path from the reflective facet, at a first angle measured from the optic axis, through said focussing lens means to be received by said cylinder mirror, said cylinder mirror reflecting the received beam along a second path through said focussing lens means to be received by the reflective facet, the reflective facet reflecting said received beam in a post scan direction, at a second angle measured from the normal which is greater than the first angle.

2. The scan angle doubling system of claim 1 wherein said scanning means, said cylinder mirror and said focussing lens means are further constructed and arranged to substantially maintain beam collimation in the tangential plane whenever the beam is reflected from the reflective facet of said rotating polygon.

3. The scan angle doubling system of claim 1 wherein said focussing lens means is a combination lens.

4. The scan angle doubling system of claim 3 wherein said combination lens uses at least one cylinder element.

5. The scan angle doubling system of claim 1 wherein the second angle is approximately twice the first angle.

6. A scanning system comprising:
   A) a light source for providing a light beam,
   B) a first focussing lens means for focussing the light beam,
   C) post scan lens means,
   D) a scanning medium,
   E) scan angle doubling means comprising:
      i) scanning means with at least one reflective facet and a normal which is perpendicular to the reflective facet,
      ii) a cylinder mirror with a tangential plane radius of curvature and a center of the radius of curvature,
      iii) a second focussing lens means with a focal length and a focal point,
      iv) said scanning means, cylinder mirror, and second focussing lens means being so arranged such that said scanning means and said cylinder mirror are opposed to each other and separated by a distance greater than the sum of the radius of curvature plus the focal length, and said second focussing lens means being interposed between said scanning means and said cylinder mirror such that the center of the radius of curvature of said cylinder mirror and the focal point of said second focussing lens means are coincident, and
      v) said scanning means, cylinder mirror, and second focussing lens means being so constructed and arranged relative to each other to reflect a beam along a first path from the reflective facet, at a first angle measured from the optic axis, through said second focussing lens means to be received by said cylinder mirror, said cylinder mirror reflecting the received beam along a second path through said second focussing lens means to be received by the reflective facet, the reflective facet reflecting said received beam in a post scan direction, at a second angle measured from the optic axis which is greater than the first angle,
   F) said light source, first focussing lens means, and scan angle doubling means so constructed and arranged relative to each other such that the light beam from the light source passes through said first focussing lens means and becomes focussed on the reflective facet, and
   G) said scan angle doubling means, post scan lens means, and scanning medium so constructed and arranged such that the beam reflected in the post scan direction passes through said post scan lens means and is received by said scanning medium.

7. The scanning system of claim 6 wherein said scanning means, said cylinder mirror and said second focussing lens means are further constructed and arranged to substantially maintain beam collimation in the tangential plane whenever the beam is reflected from the reflective facet of said rotating polygon.

8. The scanning system of claim 6 wherein said second focussing lens means is a combination lens.

9. The scanning system of claim 8 wherein the combination lens uses at least one cylinder element.

10. The scanning system of claim 1 wherein the second angle is approximately twice the first angle.

11. The scan angle doubling system of claim 1 wherein said scanning means comprises a rotating polygon.

12. The scan angle doubling system of claim 4 wherein said scanning means comprises a rotating polygon.

13. The scanning system of claim 6 wherein said scanning means comprises a rotating polygon.

14. The scanning system of claim 9 wherein said scanning means comprises a rotating polygon.

* * * * *